United States Patent
Kontinen

(10) Patent No.: US 11,022,210 B2
(45) Date of Patent: Jun. 1, 2021

(54) PLANET WHEEL SHAFT FOR A PLANETARY GEAR

(71) Applicant: Moventas Gears Oy, Jyväskylä (FI)

(72) Inventor: Tuomo Kontinen, Jyväskylä (FI)

(73) Assignee: MOVENTAS GEARS OY, Jyväskylä (FI)

( * ) Notice: Subject to any disclaimer, the term of this patent is extended or adjusted under 35 U.S.C. 154(b) by 7 days.

(21) Appl. No.: 16/715,612

(22) Filed: Dec. 16, 2019

(65) Prior Publication Data

US 2020/0191256 A1 Jun. 18, 2020

(30) Foreign Application Priority Data

Dec. 17, 2018 (EP) ................................ 18213080

(51) Int. Cl.
| | |
|---|---|
| *F16H 57/08* | (2006.01) |
| *F16H 1/36* | (2006.01) |
| *F16H 57/04* | (2010.01) |

(52) U.S. Cl.
CPC ............. *F16H 57/08* (2013.01); *F16H 1/36* (2013.01); *F16H 57/0486* (2013.01); *F16H 2057/085* (2013.01)

(58) Field of Classification Search
CPC ........ F16H 57/08; F16H 1/36; F16H 57/0486; F16H 2057/085; F16H 57/082; F16H 57/023
USPC .................................................. 475/348, 159
See application file for complete search history.

(56) References Cited

U.S. PATENT DOCUMENTS

| | | | |
|---|---|---|---|
| 2016/0341248 A1* | 11/2016 | Guettler | ................. F16C 17/02 |
| 2018/0313404 A1* | 11/2018 | Hoelzl | ................. F16C 33/122 |
| 2018/0335126 A1* | 11/2018 | Watanabe | ............... F16H 13/06 |
| 2018/0340606 A1* | 11/2018 | Deitmers | ................ F03D 15/00 |
| 2019/0203768 A1 | 7/2019 | Meyer | |

FOREIGN PATENT DOCUMENTS

| | | |
|---|---|---|
| CN | 107299966 A | 10/2017 |
| EP | 2 514 970 A1 | 10/2012 |
| EP | 3 290 751 A1 | 3/2018 |

OTHER PUBLICATIONS

European Search Report issued in EP 18213080.7, dated May 21, 2019.

\* cited by examiner

*Primary Examiner* — Roger L Pang
(74) *Attorney, Agent, or Firm* — Birch, Stewart, Kolasch & Birch, LLP

(57) ABSTRACT

A planet wheel shaft includes a bearing portion for acting as a slide-bearing in cooperation with a planet wheel of a planetary gear. On at least one axial region of the bearing portion, a cross-sectional shape deviates from a circular shape so that the bearing portion is thicker in a first direction than in a second direction perpendicular to the first direction. The deviation from the circular shape widens a wedge-shaped gap that is between the bearing portion and the planet wheel when there is load in the first direction. This facilitates oil supply to an area where hydrodynamic oil pressure is formed for carrying load in the first direction because the widening the wedge-shaped gap compensates for narrowing the gap due to ovalization of the planet wheel caused by load in the second direction.

17 Claims, 4 Drawing Sheets

PLANET WHEEL SHAFT FOR A PLANETARY GEAR

FIELD OF THE DISCLOSURE

The disclosure relates to a planet wheel shaft for a planetary gear comprising slide-bearing supported planet wheels. Furthermore, the disclosure relates to a planetary gear.

BACKGROUND

A planetary gear comprises a planet carrier, a sun wheel, a gear ring, and planet wheels meshing with the sun wheel and with the gear ring. The planet wheels are supported with planet wheel shafts which, in turn, are supported by the planet carrier. Bearings of the planet wheels can be rolling-bearings or slide-bearings. An advantage of slide-bearings with respect to rolling-bearings is that slide-bearings require less room in the radial direction and the load carrying surfaces of slide-bearings are usually larger than those of rolling-bearings. Typically, a slide-bearing of a planet wheel is designed to carry loading in a tangential direction, i.e. loading in a moving direction of the geometric rotation axis of each planet wheel, whereas ovalization of the planet wheel caused by loading in a radial direction perpendicular to the tangential direction is kept small enough by using a sufficient material thickness between the bore of the planet wheel and the root circle of the planet wheel. On the other hand, the above-mentioned material thickness of planet wheels is a factor that determines the diameter of slide-bearings of the planet wheels when the radii of the sun wheel and the gear ring are given. A larger diameter of the slide-bearings means a greater load carrying capacity, and thereby there is a motivation to minimize the above-mentioned material thickness.

The above-mentioned ovalization of a planet wheel caused by radial loading is disadvantageous because the ovalization tends to divide an area of a slide-bearing, where hydrodynamic oil pressure is formed for carrying tangential load, into two separate areas. The formation of the hydrodynamic oil pressure in an area that is later in a direction of rotation is weaker than in the area that is first in the direction of rotation. The above-described phenomenon reduces the load carrying capacity of the slide-bearing. Furthermore, the ovalization narrows a gap which is between the sliding surfaces of the slide-bearing and which is wedge-shaped because of the tangential load. The narrowing the wedge-shaped gap is an undesired phenomenon because the narrowing decreases an amount of oil supplied to areas where the hydrodynamic oil pressure is formed for carrying the tangential load. This reduces the load carrying capacity of the slide-bearing.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the present invention, there is provided a new planet wheel shaft for a planetary gear. A planet wheel shaft according to the invention comprises:
 end portions attachable to a planet carrier of a planetary gear, and
 a bearing portion axially between the end portions, the bearing portion being suitable for acting as a slide-bearing in cooperation with a planet wheel of the planetary gear.

On one or more first axial regions of the bearing portion, a cross-sectional shape of the bearing portion deviates from a circular shape so that the thickness of the bearing portion in a first direction is greater than the thickness of the bearing portion in a second direction perpendicular to the first direction. The deviation from the circular shape on the one or more first axial regions widens a gap that is between a curved bearing surface of the bearing portion and the planet wheel and that tapers in a wedge-shaped way towards an area where hydrodynamic oil pressure is formed for carrying load in the first direction when the planet wheel shaft is carrying the planet wheel. This facilitates oil supply to the area where the hydrodynamic oil pressure is formed because the above-mentioned widening the gap compensates for narrowing the gap due to ovalization of the planet wheel.

In a planet wheel shaft according to an exemplifying and non-limiting embodiment, the bearing portion comprises, in addition to the one or more first axial regions, one or more second axial regions where the cross-sectional shape of the bearing portion deviates from a circular shape so that the thickness of the bearing portion in the second direction is greater than the thickness of the bearing portion in the first direction. In this exemplifying case, the axial length of the bearing portion is divided into regions so that some of these regions carry load in the first direction whereas others of these regions carry load in the second direction. The first direction can be e.g. a tangential direction, i.e. a moving direction of the geometric rotation axis of a planet wheel, in which case the second direction is a radial direction perpendicular to the tangential direction. As explained above, the deviation from the circular shape on the one or more first axial regions reduces the negative effect of ovalization of the planet wheel when considering oil supply to areas where hydrodynamic oil pressure is formed for carrying load in the first direction. Correspondingly, the deviation from the circular shape on the one or more second axial regions reduces a negative effect of loading in the first direction when considering oil supply to areas where hydrodynamic oil pressure is formed for carrying load in the second direction.

In a planet wheel shaft according to the above-described exemplifying and non-limiting embodiment, the axial length of the bearing portion can be divided in many ways into one or more axial regions for carrying loads in different directions. For example, there can be two axial regions for carrying tangential load and one axial region for carrying radial load so that the axial region for carrying the radial load is between the two axial regions for carrying the tangential load. The load carrying capacity of the one or more axial regions for carrying the radial load reduces ovalization of a planet wheel, and thereby the material thickness between the bore of the planet wheel and the root circle of the planet wheel can be smaller. Therefore, the diameter of a slide-bearing of the planet wheel can be greater with given radii of a sun wheel and a gear ring. A further advantage of this exemplifying and non-limiting embodiment is that sliding surfaces of the one or more axial regions for carrying the radial load can be optimized from the viewpoint of the radial load only, whereas sliding surfaces of the one or more axial regions for carrying the tangential load can be optimized from the viewpoint of the tangential load only. Thus, a need for compromises is reduced.

A planet wheel shaft according to another exemplifying and non-limiting embodiment has a same cross-sectional shape over the entire length of the bearing portion so that the thickness of the bearing portion is greater in the tangential direction of a planetary gear, i.e. in the moving direction of the geometric rotation axis of a respective planet wheel, than in the radial direction perpendicular to the tangential direction. In this exemplifying case, the deviation from the circular shape is utilized so that greater ovalization of the planet wheels is allowable while still maintaining a sufficient load carrying capacity of the slide-bearings of the planet wheels. As greater ovalization of the planet wheels is allowable, the material thickness between the bore of each planet wheel and the root circle of the planet wheel can be smaller and therefore the diameter of a slide-bearing of the planet wheel can be greater with given radii of a sun wheel and a gear ring.

In accordance with the present invention, there is provided also a new planetary gear that comprises:
a sun shaft comprising a sun wheel,
a gear ring,
a planet carrier,
planet wheels meshing with the sun wheel and with the gear ring, and
planet wheel shafts according to the invention and rotatably supporting the planet wheels with respect to the planet carrier, the planet wheel shafts being arranged so that the above-mentioned second direction of each planet wheel shaft is a radial direction of the sun wheel.

Various exemplifying and non-limiting embodiments of the invention are described in accompanied dependent claims.

Exemplifying and non-limiting embodiments of the invention both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
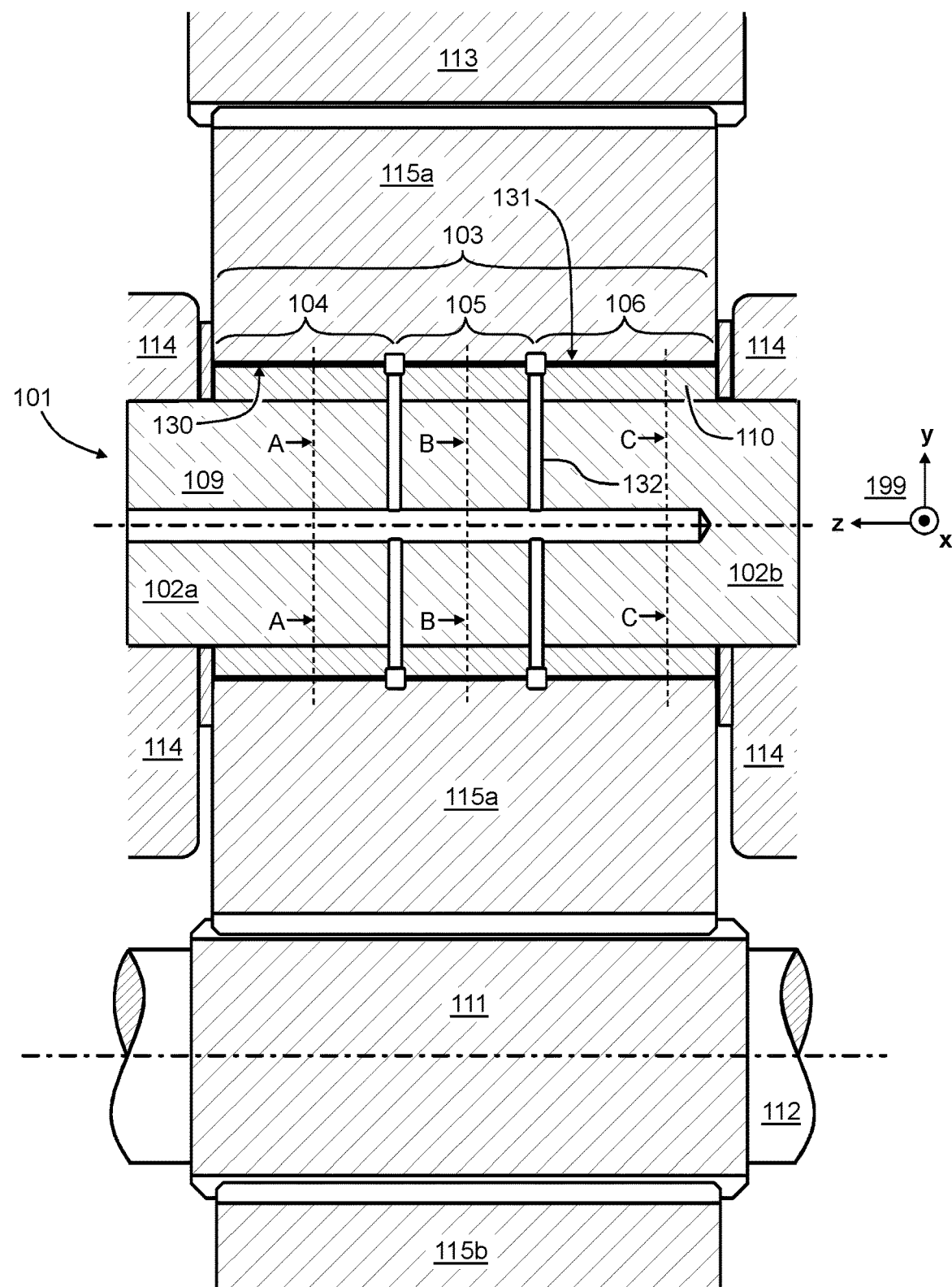
FIGS. 1a, 1b, and 1c illustrate a planetary gear comprising planet wheel shafts according to an exemplifying and non-limiting embodiment.

FIG. 1a shows a section view of a part of a planetary gear that comprises planet wheel shafts according to an exemplifying and non-limiting embodiment. The planetary gear comprises a sun shaft 112 comprising a sun wheel 111, a gear ring 113, a planet carrier 114, planet wheels, and the planet wheel shafts. The planet wheel shafts are arranged to rotatably support the planet wheels with respect to the planet carrier 114 so that the planet wheels are meshing with the sun wheel 111 and with the gear ring 113. In FIG. 1a, two of the planet wheels are denoted with references 115a and 115b and the planet wheel shaft supporting the planet wheel 115a is denoted with a reference 101. The planet carrier 114, the sun shaft 112, and the planet wheel 115b are shown only partly. The section shown in FIG. 1a is taken along a section plane which is parallel with the yz-plane of a coordinate system 199. The coordinate system 199 is fixed with the planet wheel shaft 101 so that the y-direction is a radial direction of the sun wheel 111 and the x-direction is a tangential direction i.e. a moving direction of the geometric rotation axis of the planet wheel 115a when the planet carrier 114 is rotating.

In the following, we consider the planet wheel shaft 101. The other planet wheel shafts of the planetary gear are like the planet wheel shaft 101. The planet wheel shaft 101 comprises end portions 102a and 102b and a bearing portion 103 that is axially between the end portions. The end portions 102a and 102b are attached to the planet carrier 114 as shown in FIG. 1a. The bearing portion 103 is suitable for acting as a slide-bearing in cooperation with the planet wheel 115a so that a surface 130 of the bearing portion 103 and a surface 131 of the planet wheel 115a constitute sliding surfaces of the slide-bearing. In this exemplifying case, the planet wheel shaft 101 comprises a shaft pin 109 and a sleeve element 110 surrounding the shaft pin. The end portions of the shaft pin 109 are the above-mentioned end portions 102a and 102b. The outer surface of the sleeve element 110 is suitable for acting as a slide-bearing in cooperation with the planet wheel 115a. The sleeve element 110 can be made of for example bearing material such as e.g. bronze or suitable aluminum-based alloy. In some exemplifying cases, the sleeve element 110 can be made of plastics that has low coefficient of friction with steel also when no lubricant is present. It is also possible that the sleeve element 110 is a two-layer element that comprises a backing made of e.g. steel and a surface layer made of e.g. white metal for forming the surface 130 with appropriate sliding properties and wear resistance. It is also possible that the sleeve element 110 is a multilayer element that comprises a backing made of e.g. steel, one or more intermediate layers made of one or more suitable materials that are softer than the material of the backing, and a surface coating for forming the surface 130 with appropriate sliding properties and wear resistance. It is also possible that the sleeve element 110 is made of steel. In the exemplifying planetary gear illustrated in FIG. 1a, each planet wheel shaft comprises oil supply channels and the outer surface of each planet wheel shaft comprises circumferential oil supply grooves. In this exemplifying case, also the sliding surface of each planet wheel comprises circumferential oil supply grooves. In FIG. 1a, one of the oil supply channels of the planet wheel shaft 101 is denoted with a reference 132. It is to be noted that different oil supply arrangements are possible in conjunction with planet wheel shafts according to different embodiments of the invention. For example, a planet wheel shaft according to an exemplifying and non-limiting embodiment may comprise only one or more bores, such as the channel 132 shown in FIG. 1a, for supplying oil to a gap between the outer surface of the planet wheel shaft and the planet wheel. For a further example, a planet wheel shaft according to an exemplifying and non-limiting embodiment may comprise an axial groove for supplying oil or for acting as an oil draining channel. Thus, the invention is not limited to any specific oil supply arrangements.

Figure 1B:
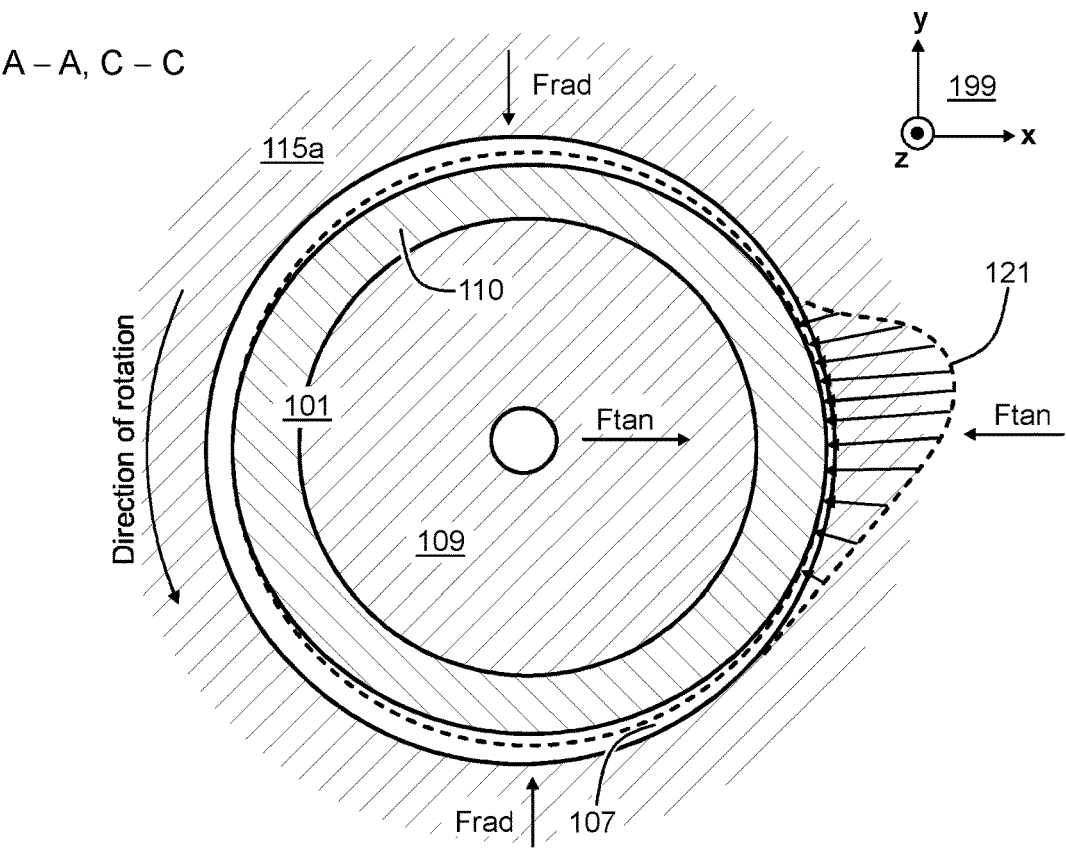

In the exemplifying planet wheel shaft 101 illustrated in FIG. 1a, the bearing portion 103 comprises first axial regions 104 and 106 and a second axial region 105 that is between the axial regions 104 and 106. On each of the axial regions 104 and 106, the cross-sectional shape of the bearing portion deviates from a circular shape so that the thickness of the bearing portion in a first direction is greater than the thickness of the bearing portion in a second direction that is perpendicular to the first direction. In this exemplifying case, the first direction is the tangential direction i.e. the x-direction of the coordinate system 199 and the second direction is the radial direction i.e. the y-direction of the coordinate system 199. The deviation from the circular shape is illustrated in FIG. 1b that shows a section taken along a line A-A shown in FIG. 1a. A section taken along a line C-C shown in FIG. 1a is similar to the section taken along the line A-A. In FIG. 1b, the circular shape is depicted with a dashed line circle. As shown in FIG. 1b, the deviation from the circular shape widens a gap 107 that is between the outer surface of the planet wheel shaft and the planet wheel 115a and that tapers in a wedge-shaped way towards an area where hydrodynamic oil pressure is formed for carrying tangential load i.e. load in the x-direction of the coordinate system 199. In FIG. 1b, the tangential load is depicted with arrows $F_{tan}$ and the spatial distribution of the hydrodynamic oil pressure carrying the tangential load is depicted with a dashed line 121. Oil supply to the area where the hydrodynamic oil pressure is formed is facilitated because the above-mentioned widening the gap 107 compensates for narrowing the gap 107 due to ovalization of the planet wheel 115a. The planet wheel shaft 101 may comprise, for example but not necessarily, a radially directed, i.e. an y-directional, oil supply channel for supplying oil to the gap 107. The oil supply channel is not shown in FIG. 1b. Furthermore, the area deviating from the circular shape may comprise an axial groove for oil supply and/or oil drainage. However, the above-described principle is not limited to any specific oil supply arrangements. The ovalization is caused by radial load directed to the planet wheel 115a. In FIG. 1b, the radial load is depicted with arrows $F_{rad}$. Thus, the deviation from the circular shape reduces the effect of the radial load on the ability of the axial regions 104 and 106 to carry the tangential load.

Figure 1C:
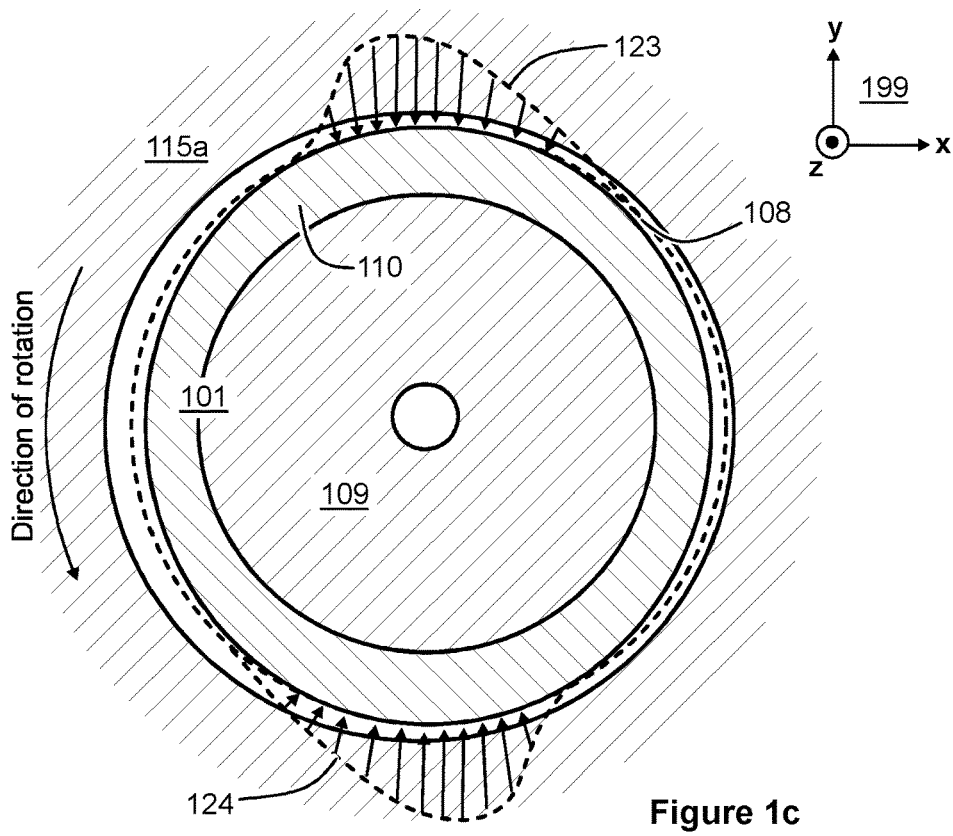

On the above-mentioned axial region 105, the cross-sectional shape of the bearing portion deviates from the circular shape so that the thickness of the bearing portion in the second direction, i.e. in the radial direction, is greater than the thickness of the bearing portion in the first direction, i.e. in the tangential direction. The deviation from the circular shape is illustrated in FIG. 1c that shows a section taken along a line B-B shown in FIG. 1a. In FIG. 1c, the circular shape is depicted with a dashed line circle. As shown in FIG. 1c, the deviation from the circular shape widens a gap 108 that is between the outer surface of the planet wheel shaft and the planet wheel 115a and that tapers in a wedge-shaped way towards an area where hydrodynamic oil pressure is formed for carrying the radial load i.e. load in the y-direction of the coordinate system 199. In FIG. 1c, the spatial distributions of the hydrodynamic oil pressure carrying the radial load is depicted with dashed lines 123 and 124. Oil supply to the area where the hydrodynamic oil pressure 123 is formed is facilitated because the above-mentioned widening the gap 108 compensates for narrowing the gap 108 due to the tangential load that pushes the planet wheel 115a towards the negative x-direction of the coordinate system 199. Thus, the deviation from the circular shape reduces the effect of the tangential load on the ability of the axial region 105 to carry the radial load. The ability of the axial region 105 to carry the radial load reduces to above-mentioned ovalization of the planet wheel 115a. The planet wheel shaft 101 may comprise, for example but not necessarily, a tangentially directed, i.e. an x-directional, oil supply channel for supplying oil to the gap 108. The oil supply channel is not shown in FIG. 1c. Furthermore, the area deviating from the circular shape may comprise an axial groove for oil supply and/or oil drainage. However, the above-described principle is not limited to any specific oil supply arrangements.

As explained above, the bearing portion 103 of the planet wheel shaft 101 is divided into the axial regions 104-106 so that radial load does not substantially impair the ability of the axial regions 104 and 106 to carry tangential load and the tangential load does not substantially impair the ability of the axial region 105 to carry the radial load. The sliding surfaces of the axial regions 104 and 106 for carrying the tangential load can be optimized from the viewpoint of the tangential load. Correspondingly, the sliding surface of the axial region 105 for carrying the radial load can be optimized from the viewpoint of the radial load. Thus, a need for compromises is reduced.

It is to be noted that the above-described planet wheel shaft 101 is merely a non-limiting example, and the axial length of a bearing portion of a planet wheel shaft can be divided in many ways into one or more axial regions for carrying tangential load and one or more axial regions for carrying radial load. Furthermore, it is also possible that a planet wheel shaft according to an exemplifying and non-limiting embodiment has a same cross-sectional shape over the entire length of the bearing portion so that the thickness of the bearing portion is greater in the tangential direction than in the radial direction.

Figure 2A:
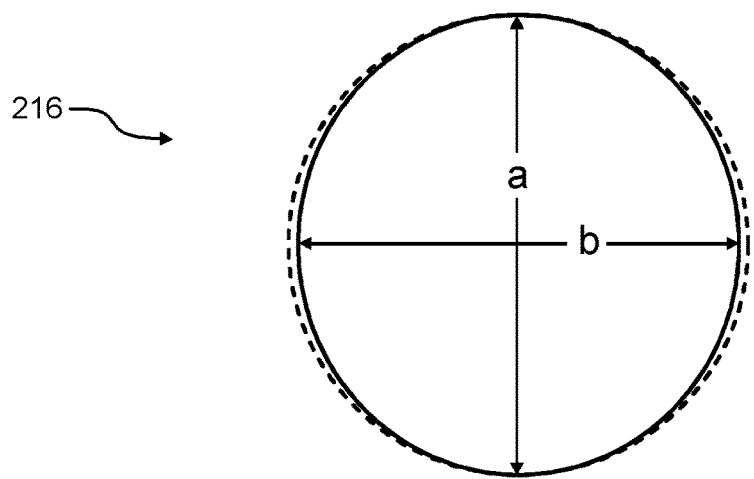
FIGS. 2a, 2b, and 2c illustrate exemplifying cross-sectional shapes for planet wheel shafts according to exemplifying and non-limiting embodiments.
Figure 2B:
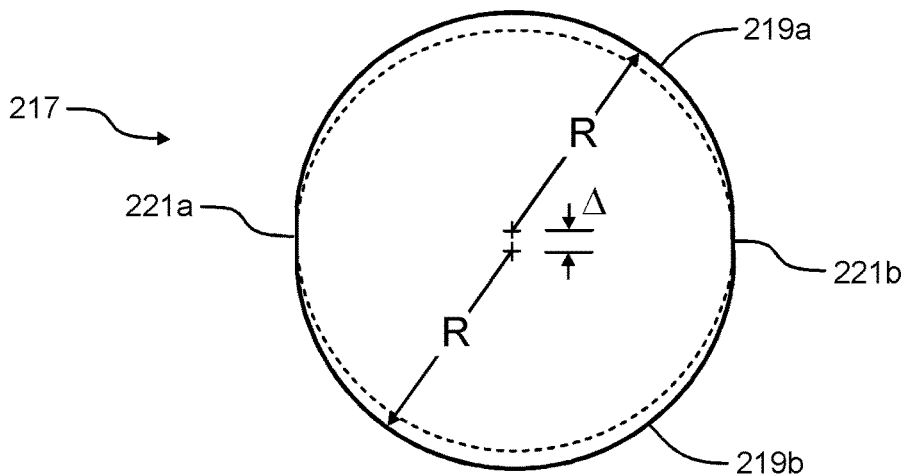
Figure 2C:
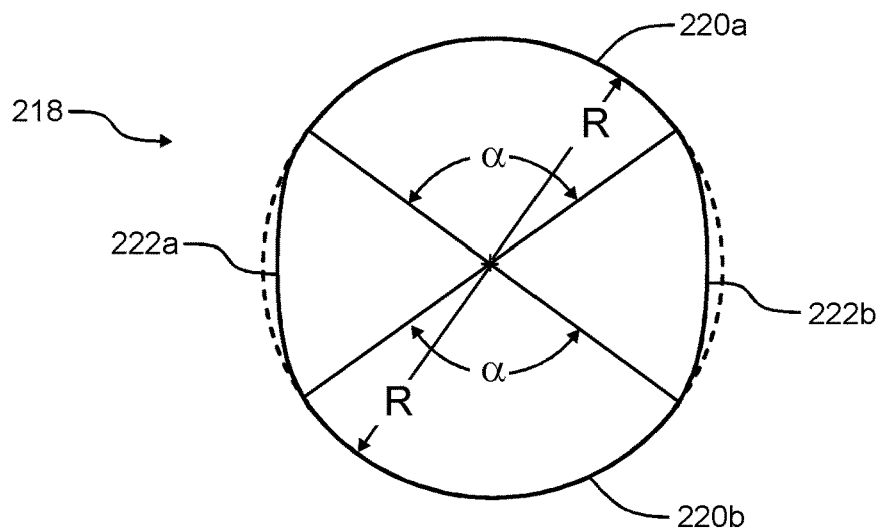

FIGS. 2a, 2b, and 2c illustrate exemplifying cross-sectional shapes for planet wheel shafts according to exemplifying and non-limiting embodiments. FIG. 2a illustrates an exemplifying cross-sectional shape 216 that deviates from a circular shape so that the cross-sectional shape 216 is elliptical. The elliptical cross-sectional shape 216 has a major axis a and a minor axis b. The circular shape is depicted with a dashed line circle. In an exemplifying case where the cross-sectional shape on the axial regions 104 and 106 shown in FIG. 1a is the cross-sectional shape 216 shown in FIG. 2a, the major axis a is parallel with the x-axis of the coordinate system 199. Correspondingly, in an exemplifying case where the cross-sectional shape on the axial region 105 shown in FIG. 1a is the cross-sectional shape 216 shown in FIG. 2a, the major axis a is parallel with the y-axis of the coordinate system 199. In a planet wheel shaft according to an exemplifying and non-limiting embodiment, the major axis a is at least 0.05 permille longer than the minor axis b. In a planet wheel shaft according to an exemplifying and non-limiting embodiment, the major axis a is at least 0.1 permille longer than the minor axis b. In a planet wheel shaft according to an exemplifying and non-limiting embodiment, the major axis a is at least 0.2 permille longer than the minor axis b. In a planet wheel shaft according to an exemplifying and non-limiting embodiment, the major axis a is at least 1 permille longer than the minor axis b. In a planet wheel shaft according to an exemplifying and non-limiting embodiment, the major axis a is at least 10 permille longer than the minor axis b.

FIG. 2b illustrates an exemplifying cross-sectional shape 217 whose outline consists of two circle arches 219a and 219b and two line-elements 221a and 221b. The circle arches 219a and 219b have a same radius R of curvature and open towards each other. The line-elements 221a and 221b connect the ends of the circle arch 219a to the ends of the circle arch 219b. Advantageously, the line-elements 221a and 221b are shaped to join the circle arches 219a and 219b smoothly without forming corners at the connection points between the line-elements and the circle arches. The cross-sectional shape 217 deviates from a circular shape so that the centers of curvature of the circle arches 219a and 219b are a distance Δ apart from each other. The circular shape is depicted with a dashed line circle. In a planet wheel shaft according to an exemplifying and non-limiting embodiment, the distance Δ is at least 0.1 permille of the radius R. In a planet wheel shaft according to an exemplifying and non-limiting embodiment, the distance Δ is at least 0.2 permille of the radius R. In a planet wheel shaft according to an exemplifying and non-limiting embodiment, the distance Δ is at least 0.4 permille of the radius R. In a planet wheel shaft according to an exemplifying and non-limiting embodiment, the distance Δ is at least 2 permille of the radius R. In a planet wheel shaft according to an exemplifying and non-limiting embodiment, the distance Δ is at least 20 permille of the radius R.

FIG. 2c illustrates an exemplifying cross-sectional shape 218 whose outline consists of two circle arches 220a and 220b and two line-elements 222a and 222b. The circle arches 220a and 220b have a same radius R of curvature, a same center of curvature, and an equal center angle α. The line-elements 222a and 222b connect the ends of the circle arch 220a to the ends of the circle arch 220b. Advantageously, the line-elements 222a and 222b are shaped to join the circle arches 221a and 221b smoothly without forming corners at the connection points between the line-elements and the circle arches. The cross-sectional shape 218 deviates from a circular shape so that the center angle α is less than 180 degrees and the two line-elements 222a and 222b are inside a geometric circle concurring with the circle arches 220a and 220b. In FIG. 2c, geometric circle is depicted with a dashed line. In a planet wheel shaft according to an exemplifying and non-limiting embodiment, the center angle α is in the range from 30 degrees to 140 degrees. In a planet wheel shaft according to an exemplifying and non-limiting embodiment, the center angle α is in the range from 60 degrees to 140 degrees. In a planet wheel shaft according to an exemplifying and non-limiting embodiment, the center angle α is in the range from 80 degrees to 140 degrees. In a planet wheel shaft according to an exemplifying and non-limiting embodiment, the center angle α is in the range from 100 degrees to 140 degrees.

Figure 3:
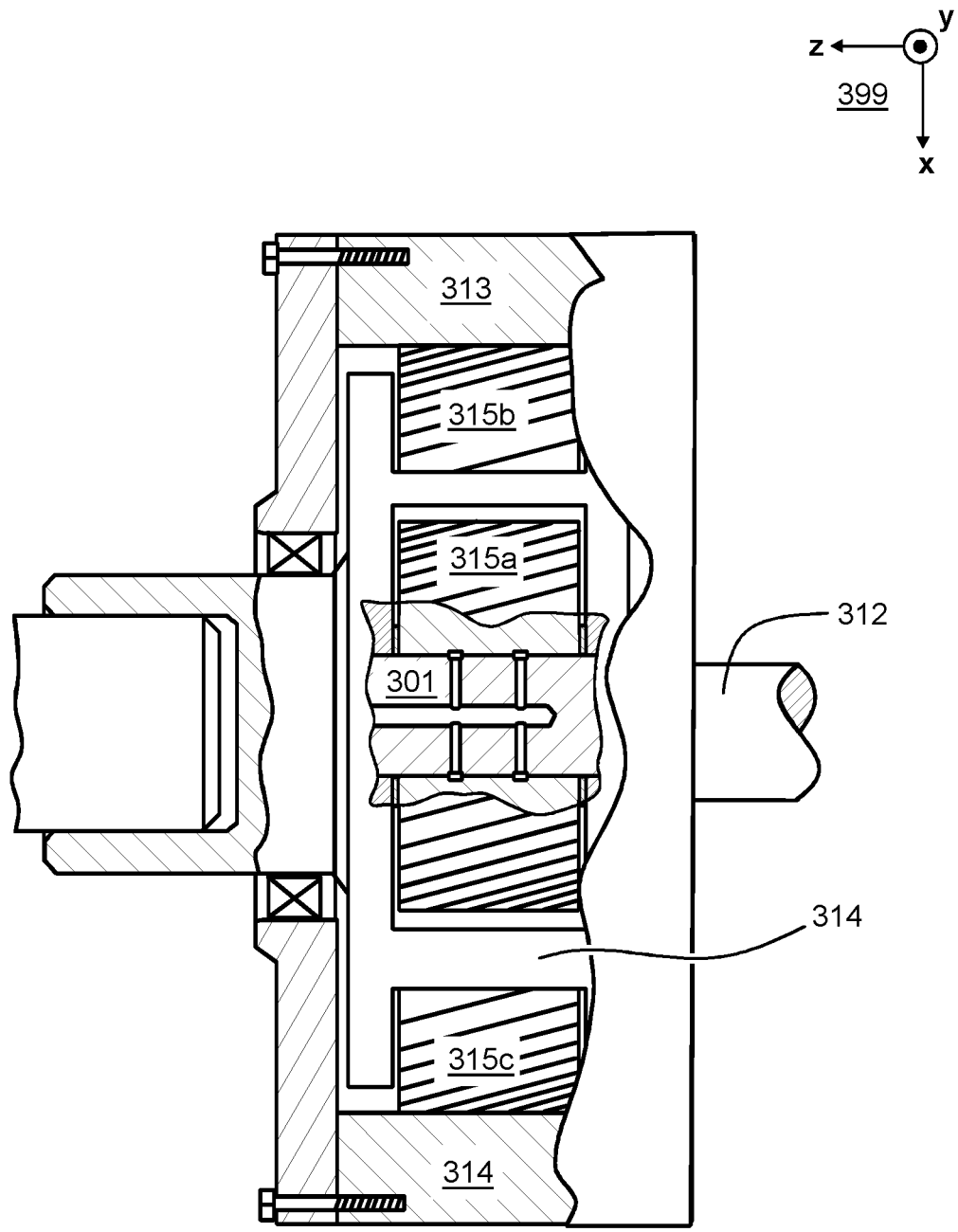
FIG. 3 illustrates of a planetary gear comprising planet wheel shafts according to an exemplifying and non-limiting embodiment.

FIG. 3 illustrates a planetary gear according to an exemplifying and non-limiting embodiment. The planetary gear comprises a sun shaft 312, a gear ring 313, a planet carrier 314, planet wheels, and planet wheel shafts rotatably supporting the planet wheels with respect to the planet carrier 314. The sun shaft 312 comprises a sun wheel, and the planet carrier 314 is arranged to support the planet wheels so that the planet wheels are meshing with the sun wheel and with the gear ring. The sun wheel is not shown in FIG. 3. In FIG. 3, three of the planet wheels are denoted with references 315a, 315b, and 315c. The planet wheel 315a is presented as a partial section view so that FIG. 3 shows a part of a section view of a planet wheel shaft 301 that supports the planet wheel 315a. As illustrated in FIG. 3, the planet wheel shafts do not comprise sleeve elements for forming slide-bearings together with the planet wheels. The shape of the outer surface of each planet wheel shaft can be for example according to any of the examples described above with reference to FIGS. 1a-1c and/or to FIGS. 2a-2c. The planetary gear illustrated in FIG. 3 can be more cost effective compared to a planetary gear where slide-bearings of planet wheels are implemented with sleeve elements. An advantage of the sleeve elements is however that the sleeve elements increase the diameter of the slide-bearings and thereby the sleeve element increase the load carrying surface areas and sliding speed.

In the exemplifying planetary gear illustrated in FIG. 3, the gear ring 313 is stationary and the planet carrier 314 and the sun shaft 312 are rotatable. It is also possible that for example the sun shaft is stationary, and the planet carrier and the gear ring are rotatable.

In a planetary gear according to an exemplifying and non-limiting embodiment, each planet wheel comprises a sleeve element that comprises bearing material, e.g. bronze, suitable aluminum-based alloy, white metal, or plastics, and is attached to the bore of the planet wheel. Depending on the bearing material, the sleeve element can be made of single material or it can be a two- or multilayer sleeve element. The inner surface of the sleeve element constitutes a sliding surface of the planet wheel for constituting a slide-bearing in cooperation with e.g. a steel surface of a planet wheel shaft. In this exemplifying case, each planet wheel shaft can be for example such as the planet wheel shaft 301 illustrated in FIG. 3. The shape of the outer surface of each planet wheel shaft can be for example according to any of the examples described above with reference to FIGS. 1a-1c and/or to FIGS. 2a-2c. The sleeve element can be attached to the bore of the planet wheel for example with a shrink fit.

In a planetary gear according to an exemplifying and non-limiting embodiment, each planet wheel shaft comprises a shaft pin and a layer of sliding material that has been cast or otherwise deposited on the surface of the shaft pin. The sliding material can be for example bearing metal, plastics, or some other material having sufficient sliding properties. In this exemplifying case, the outer surface of the layer of the sliding material constitutes a sliding surface of the planet wheel shaft for constituting a slide-bearing in cooperation with e.g. a steel surface of a planet wheel. The shape of the above-mentioned sliding surface can be for example according to any of the examples described above with reference to FIGS. 1a-1c and/or to FIGS. 2a-2c.

In a planetary gear according to an exemplifying and non-limiting embodiment, each planet wheel comprises a layer of sliding material that has been cast or otherwise deposited on the surface of the bore of the planet wheel. In this exemplifying case, a surface of the layer of the sliding material constitutes a sliding surface of the planet wheel for constituting a slide-bearing in cooperation with e.g. a steel surface of a planet wheel shaft. In this exemplifying case, each planet wheel shaft can be for example such as the planet wheel shaft 301 illustrated in FIG. 3. The shape of the outer surface of each planet wheel shaft can be for example according to any of the examples described above with reference to FIGS. 1*a*-1*c* and/or to FIGS. 2*a*-2*c*.

In a planetary gear according to an exemplifying and non-limiting embodiment, the planet wheels and the planet wheel shafts are made of steel so that sliding surfaces of both the planet wheels and the planet wheel shafts are steel surfaces. In many cases, the steel surfaces provide sufficient tribological properties if the surfaces are smooth enough. The shape of the outer surface of each planet wheel shaft can be for example according to any of the examples described above with reference to FIGS. 1*a*-1*c* and/or to FIGS. 2*a*-2*c*.

In a planetary gear according to an exemplifying and non-limiting embodiment, the planet wheels are made of steel and the planet wheel shafts are made of cast iron so that sliding surfaces of the planet wheels are steel surfaces and sliding surfaces of the planet wheel shafts are cast iron surfaces. Cast iron has advantageous tribological properties because of graphite contained by the cast iron. The shape of the outer surface of each planet wheel shaft can be for example according to any of the examples described above with reference to FIGS. 1*a*-1*c* and/or to FIGS. 2*a*-2*c*.

It is to be noted that the above-described slide-bearing arrangements are non-limiting examples only, and the principle described above with reference to FIGS. 1*a*-1*c* and/or to FIGS. 2*a*-2*c* is applicable with different slide-bearing arrangements, i.e. the applicability of the principle is not limited to any particular slide-bearing arrangements.

The specific examples provided in the description given above should not be construed as limiting the scope and/or the applicability of the accompanied claims. Lists and groups of examples provided in the description given above are not exhaustive unless otherwise explicitly stated.

What is claimed is:

1. A planet wheel shaft for a planetary gear, the planet wheel shaft comprising:
    end portions attachable to a planet carrier of the planetary gear; and
    a bearing portion axially between the end portions, the bearing portion being suitable for acting as a slide-bearing in cooperation with a planet wheel of the planetary gear,
    wherein, on one or more first axial regions of the bearing portion, a cross-sectional shape of the bearing portion deviates from a circular shape so that a thickness of the bearing portion in a first direction is greater than the thickness of the bearing portion in a second direction perpendicular to the first direction, the deviation from the circular shape on the one or more first axial regions being suitable for widening a gap being between a curved bearing surface of the bearing portion and the planet wheel and tapering in a wedge-shaped way towards an area where hydrodynamic oil pressure is formed for carrying load in the first direction when the planet wheel shaft is carrying the planet wheel.

2. The planet wheel shaft according to claim 1, wherein, on the one or more first axial regions of the bearing portion, the thickness of the bearing portion in the first direction is at least 0.05 permille greater than the thickness of the bearing portion in the second direction.

3. The planet wheel shaft according to claim 1, wherein, on one or more second axial regions of the bearing portion non-overlapping with the one or more first axial regions of the bearing portion, the cross-sectional shape of the bearing portion deviates from the circular shape so that the thickness of the bearing portion in the second direction is greater than the thickness of the bearing portion in the first direction, the deviation from the circular shape on the one or more second axial regions being suitable for widening a gap being between the bearing portion and the planet wheel and tapering in a wedge-shaped way towards an area where hydrodynamic oil pressure is formed for carrying load in the second direction.

4. The planet wheel shaft according to claim 3, wherein the planet wheel shaft comprises two axial regions each being similar to each of the one or more first axial regions, and the second axial region of the bearing portion is between the two axial regions of the bearing portion.

5. The planet wheel shaft according to claim 3, wherein, on the one or more second axial regions of the bearing portion, the thickness of the bearing portion in the second direction is at least 0.05 permille greater than the thickness of the bearing portion in the first direction.

6. The planet wheel shaft according to claim 4, wherein, on the one or more second axial regions of the bearing portion, the thickness of the bearing portion in the second direction is at least 0.05 permille greater than the thickness of the bearing portion in the first direction.

7. The planet wheel shaft according to claim 1, wherein the cross-sectional shape of the bearing portion deviates from the circular shape so that the cross-sectional shape of the bearing portion is elliptical.

8. The planet wheel shaft according to claim 7, wherein a major axis of the elliptical cross-sectional shape of the bearing portion is at least 0.05 permille longer than a minor axis of the elliptical cross-sectional shape of the bearing portion.

9. The planet wheel shaft according claim 1, wherein the cross-sectional shape of the bearing portion deviates from the circular shape so that an outline of the cross-sectional shape of the bearing portion consists of two circle arches having a same radius of curvature and opening towards each other and of two line-elements connecting ends of a first one of the circle arches to ends of a second one of the circle arches.

10. The planet wheel shaft according to claim 9, wherein the two line-elements are shaped to join the two circle arches without forming corners at connection points between the two line-elements and the two circle arches.

11. The planet wheel shaft according to claim 9, wherein centers of curvature of the two circle arches are a distance apart from each other.

12. The planet wheel shaft according to claim 10, wherein centers of curvature of the two circle arches are a distance apart from each other.

13. The planet wheel shaft according to claim 11, wherein the distance is at least 0.1 permille of the radius of curvature of the circle arches.

14. The planet wheel shaft according to claim 9, wherein the two circle arches have a same center of curvature and an equal center angle less than 180 degrees, and the two line-elements are inside a geometric circle concurring with the two circle arches.

15. The planet wheel shaft according to claim 14, wherein the center angle is in the range from 30 degrees to 140 degrees.

16. The planet wheel shaft according to claim 1, wherein the planet wheel shaft comprises a shaft pin whose end portions are the end portions of the planet wheel shaft, and a sleeve element surrounding the shaft pin and having an outer surface suitable for acting as the slide-bearing in cooperation with the planet wheel of the planetary gear, the cross-sectional shape of the bearing portion of the planet wheel shaft being a cross-sectional shape of the outer surface of the sleeve element.

17. A planetary gear comprising:
a sun shaft comprising a sun wheel;
a gear ring;
a planet carrier;
planet wheels meshing with the sun wheel and with the gear ring; and
planet wheel shafts rotatably supporting the planet wheels with respect to the planet carrier,
wherein each of the planet wheel shafts comprises:
end portions attached to the planet carrier; and
a bearing portion axially between the end portions, the bearing portion being suitable for acting as a slide-bearing in cooperation with a corresponding one of the planet wheels,
wherein, on one or more first axial regions of the bearing portion, a cross-sectional shape of the bearing portion deviates from a circular shape so that a thickness of the bearing portion in a first direction is greater than the thickness of the bearing portion in a second direction perpendicular to the first direction, the deviation from the circular shape on the one or more first axial regions being suitable for widening a gap being between a curved bearing surface of the bearing portion and the planet wheel and tapering in a wedge-shaped way towards an area where hydrodynamic oil pressure is formed for carrying load in the first direction when the planet wheel shaft is carrying the planet wheel, and wherein the planet wheel shafts are arranged so that the second direction of each planet wheel shaft is a radial direction of the sun wheel.

\* \* \* \* \*